United States Patent
Nilsen et al.

(10) Patent No.: US 7,445,251 B2
(45) Date of Patent: Nov. 4, 2008

(54) TWO-PIECE OIL FILTER OIL COOLER CONNECTOR BOLT

(75) Inventors: Martin J. Nilsen, Hampshire, IL (US); Michael E. Ward, Geneva, IL (US)

(73) Assignee: Illinois Tool Works Inc., Glenview, IL (US)

( * ) Notice: Subject to any disclaimer, the term of this patent is extended or adjusted under 35 U.S.C. 154(b) by 261 days.

(21) Appl. No.: 11/142,706

(22) Filed: Jun. 1, 2005

(65) Prior Publication Data

US 2006/0028019 A1 Feb. 9, 2006

Related U.S. Application Data

(60) Provisional application No. 60/599,721, filed on Aug. 6, 2004.

(51) Int. Cl.
*F16L 13/04* (2006.01)
*F16L 49/00* (2006.01)
*F16B 39/282* (2006.01)
*B01D 27/00* (2006.01)
*F16B 35/02* (2006.01)

(52) U.S. Cl. ............... 285/382; 285/303; 285/330; 285/382.1; 285/382.4; 411/191; 411/220; 411/383; 411/924.1

(58) Field of Classification Search ............ 285/298, 285/303, 330, 381.1, 4, 119, 382, 382.1, 285/382.2, 382.4, 382.5, 382.7; 411/430, 411/432, 427, 191, 190, 389, 220, 383, 384, 411/395, 548, 924.1, 924
See application file for complete search history.

(56) References Cited

U.S. PATENT DOCUMENTS

| 236,723 | A | * | 1/1881 | Sellers | 411/427 |
|---|---|---|---|---|---|
| 1,329,479 | A | * | 2/1920 | Savon | 285/382.2 |
| 1,570,565 | A | * | 1/1926 | Hanner | 411/333 |
| 1,678,640 | A | * | 7/1928 | Ward | 285/382.2 |
| 1,768,095 | A | * | 6/1930 | Arthur | 285/382.2 |
| 1,994,210 | A | * | 3/1935 | Chobert | 29/507 |
| 3,068,563 | A | * | 12/1962 | Reverman | 29/458 |
| 3,134,611 | A | * | 5/1964 | Iversen | 285/54 |
| 3,457,573 | A | * | 7/1969 | Payne et al. | 411/395 |
| 3,561,251 | A | * | 2/1971 | Matsumoto | 72/416 |
| 3,689,112 | A | * | 9/1972 | Slator et al. | 285/39 |
| 3,895,177 | A | * | 7/1975 | Muslin | 174/669 |
| 4,433,656 | A | * | 2/1984 | Norwood, Sr. | 123/196 A |
| 4,452,695 | A | * | 6/1984 | Schmidt | 210/167.05 |
| 5,089,129 | A | * | 2/1992 | Brigman | 210/223 |
| 6,059,338 | A | * | 5/2000 | Diederichs | 285/55 |
| 6,474,701 | B1 | * | 11/2002 | Bowles et al. | 285/382.1 |
| 6,560,985 | B1 | * | 5/2003 | Chu | 62/503 |
| 2001/0037971 | A1 | * | 11/2001 | Bergeron | 210/443 |
| 2005/0029811 | A1 | * | 2/2005 | Thorensen | 285/382 |

FOREIGN PATENT DOCUMENTS

| CN | 2177858 Y | 9/1994 |
|---|---|---|
| DE | 19844878 A1 | 4/2000 |
| GB | 1376561 A | 12/1974 |

\* cited by examiner

Primary Examiner—James M Hewitt
Assistant Examiner—Jay R Ripley

(57) ABSTRACT

A connector bolt for securing an oil cooler to an engine block is made of first and second telescopic pieces. The bolt can be made in different lengths by adjusting the telescopic position of the first and second pieces. The length is fixed by securing the relative positions of the first and second pieces.

12 Claims, 3 Drawing Sheets

TWO-PIECE OIL FILTER OIL COOLER CONNECTOR BOLT

CROSS-REFERENCE TO RELATED APPLICATIONS

The present regular U.S. patent application claims the benefits of U.S. Provisional Application Ser. No. 60/599,721 filed on Aug. 6, 2004.

FIELD OF THE INVENTION

The present invention relates generally to automobile lubrication systems and, more particularly, the invention pertains to lubrication systems having oil filter and oil cooler assemblies connected to each other. Specifically, the invention pertains to a connector bolt interconnecting the oil filter, oil cooler and the engine.

BACKGROUND OF THE INVENTION

Lubrication systems for internal combustion engines include an oil pan providing a reservoir of lubrication oil that is circulated through a variety of passages for lubricating the internal moving parts of the engine. An oil pump is operated by and synchronized with the crank shaft of the engine to draw oil from the oil reservoir and circulate the oil through the engine. The oil is transmitted under pressure through an oil filter to clean the oil prior to circulating the oil through the engine.

It is known for oil filters to include spaced apart entry holes around an outer periphery of the filter to allow oil to pass through and into the filter. It is known to provide an exit passageway through the center of the oil filter, to allow oil to flow from the filter back to the automobile engine for lubrication, purposes. It is known to provide the oil filter attachment by way of a threadable connection received by a male member on the engine. Basic systems as described have been used successfully for a lengthy period of time.

Advancements in engine design, including changes to improve fuel efficiency and engine reliability have developed a desire to cool the engine oil to minimize heat buildup. It is known to provide a radiator-like device operatively connected to the oil filter, and to flow the oil through the cooler in heat transfer relationship with a coolant also flowing through the cooler. In this way, heat is transferred from the oil to the coolant, and heat build-up in the oil is reduced. It is further known to use one piece connector bolts to connect the cooler device to the filter and to connect either the filter or the cooler device to the engine. A problem with known connector arrangements of this type is that the required dimensions of the bolt necessitate fabrication by machining or other expensive fabrication techniques. Cold forming and other less expensive fabrication techniques can not be used. Machining a bolt of this type adds significantly to the manufacturing cost and expense and generates significant material waste.

Another disadvantage of known connector bolts of the one-piece type is that engine configurations and the sizes and shapes of oil coolers oil filters used thereon vary from one engine to another. Accordingly, the connector bolt by which the cooler is attached to the engine may differ in length significantly from one engine to another engine. As a result, manufacturers of engine connector bolts for oil coolers have had to manufacture a variety of different parts for the different engine configurations on which the bolts are used. Engine assembly plants must stock and distribute connector bolts of all required sizes. The manufacture and handling of multiple sizes decreases efficiency and increases complexity as well as potential errors. Accordingly, it is desirable to provide a connector bolt assembly that can be adjusted for use on engines of different sizes to minimize complexity. It is further desirable to provide a connector bolt assembly that can be manufactured by inexpensive techniques.

SUMMARY OF THE INVENTION

The present invention provides a two-piece connector bolt assembly utilizing smaller portions that can be manufactured by inexpensive means such as cold forming. The two-piece assembly is adaptable to accommodate a variety of lengths for the completed bolt assembly. The components of the bolt assembly can be adjusted during assembly for use on engines of different configurations.

In one aspect thereof, the present invention provides a connector bolt with a first hollow piece configured for attachment to a first object and a second hollow piece configured for attachment to a second object. The first hollow piece receives the second hollow piece therein in a fluid tight engagement whereby fluid can flow through the first and second pieces. A securement configuration between the first and second pieces fixes an adjusted position of the second piece in the first piece for establishing an overall length of the connector bolt.

In another aspect thereof, the present invention provides a connector bolt for connecting an oil filter and oil cooler to an automobile engine block. The connector bolt has a first hollow piece having a first hollow piece distal end with a thread for threaded engagement with an engine block; a second hollow piece having a second hollow piece threaded end for threaded engagement with an oil filter, and a flange for capturing an oil cooler between the flange and the engine block. The second hollow piece is received telescopically in the first hollow piece to establish an overall length of the connector bolt, with the first hollow piece distal end and the second hollow piece distal end being at opposite ends of the connector bolt. The first hollow piece has a deformation compressed against the second hollow piece therein.

In a still further aspect thereof, the present invention provides a method for making a connector bolt for connecting an oil filter and oil cooler to an automobile engine block. The method has steps of providing a first hollow piece with a threaded first hollow piece distal end configured for connecting to an engine block; providing a second hollow piece with a threaded second hollow piece distal end configured for connecting to an oil filter; inserting an end of the second hollow piece opposite the second hollow piece distal end into an end of the first hollow piece opposite the first hollow piece distal end; advancing the second hollow piece within the first hollow piece to establish a desired overall length between the first and second hollow piece distal ends; and fixing the position of the first hollow piece relative to the second hollow piece.

An advantage of the present invention is providing a connector bolt that can be manufactured by inexpensive techniques, such as cold forming.

Another advantage of the present invention is providing a connector bolt assembly for internal combustion engine oil coolers that can be adjusted during assembly to accommodate oil coolers of different size and engines of different configuration.

Other features and advantages of the invention will become apparent to those skilled in the art upon review of the following detailed description, claims and drawings in which like numerals are used to designate like features.

Figure 1:
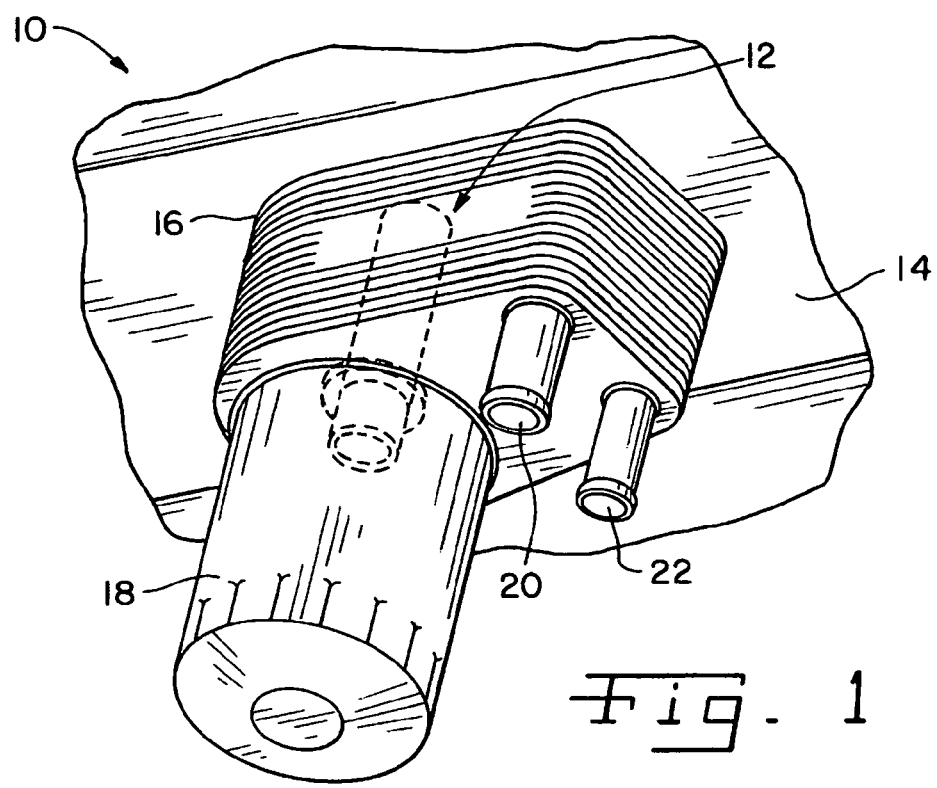
FIG. 1 is a perspective view of an oil cooler and oil filter assembly utilizing a connector bolt in accordance with the present invention.
Figure 2:
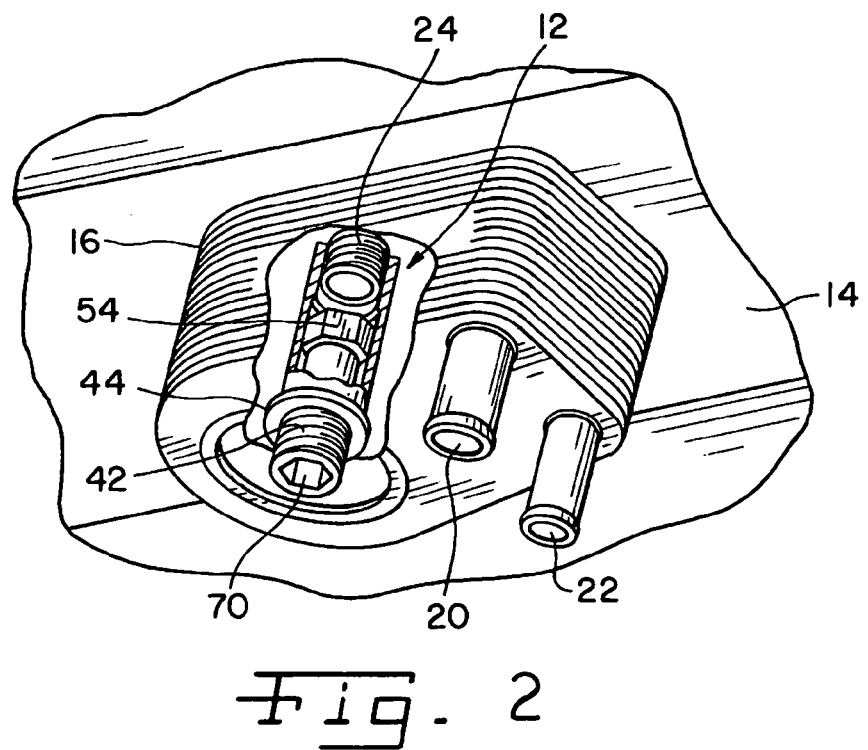
FIG. 2 is a perspective view partially broken away and in partial cross section illustrating the connector bolt installed in the engine and oil cooler.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates an internal combustion engine having an oil filter/cooler connector bolt 12 in accordance with the present invention securing an engine block 14 and oil cooler 16. An oil filter 18 is connected to the assembly of bolt 12 and oil cooler 16. It should be understood that the size, shape and general configuration of cooler 16 and filter 18 can vary from one engine 10 to another engine 10, and the specific example thereof shown in the drawings is merely exemplary.

Oil cooler 16 has an inlet 20 and an outlet 22 for passing coolant through cooler 16. Coolant can be supplied from the engine cooling system in known fashion. Engine oil from a lubrication system is circulated in heat exchange relationship with the coolant through oil cooler 16 and is passed through filter 18 for contaminant removal. The manner in which engine oil is circulated through oil coolers and oil filters is well-known to those skilled in the art, and will not be describer in further detail herein. Connector bolt 12 is secured to a stud 24 attached to engine block 14, and captures and holds oil cooler 16 against engine block 14. Oil filter 18 is connected to bolt 12 adjacent oil cooler 16. Stud 24 and connector bolt 12 are hollow for receiving the flow of oil there through, from the center of oil filter 18.

Figure 3:
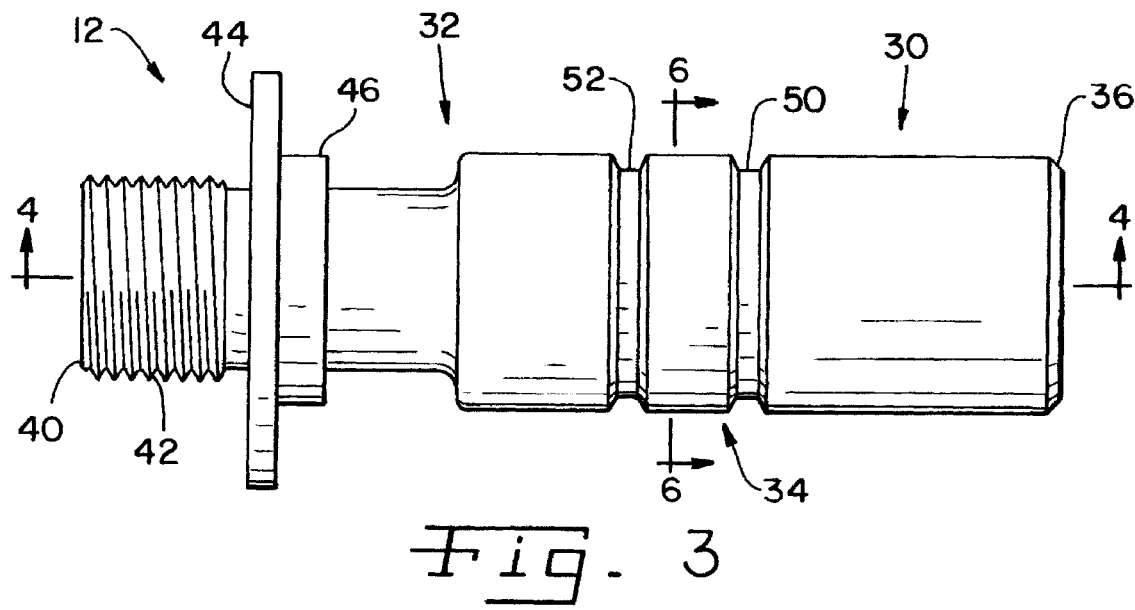
FIG. 3 is an elevational view of a connector bolt in accordance with the present invention.
Figure 4:
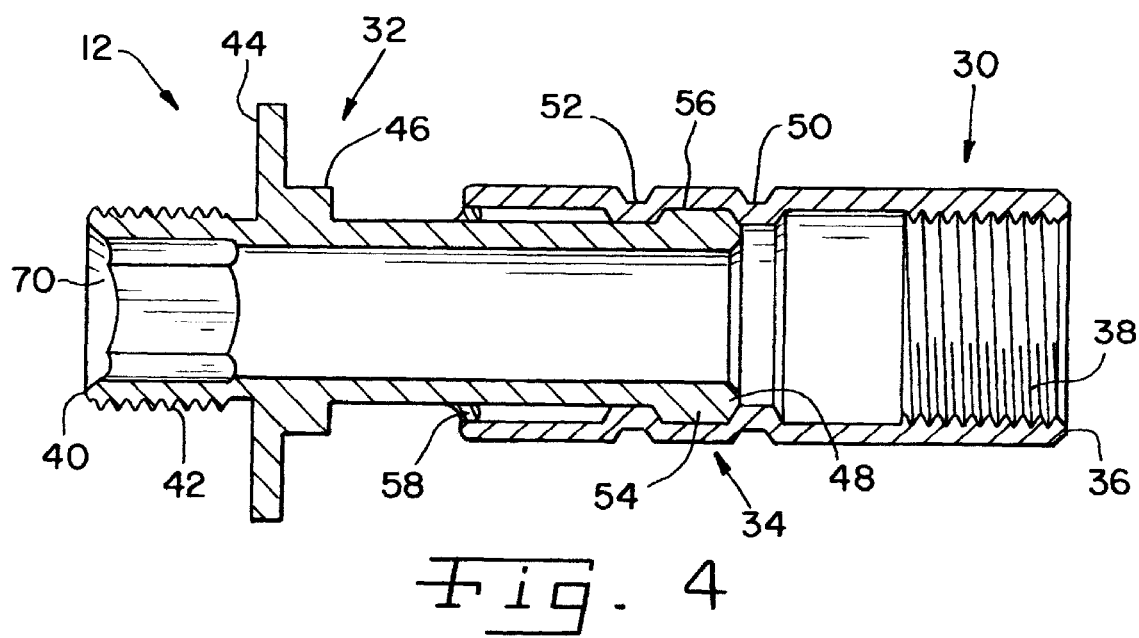
FIG. 4 is a cross-sectional view of the connector bolt shown in FIG. 3, taken along line 4-4 of FIG. 3.

With reference now more specifically to FIGS. 3 and 4, connector bolt 12 will be described in greater detail. Connector bolt 12 includes first and second pieces telescopically arranged one in the other. Thus, a base or first piece 30 is configured for attachment to engine block 14 and an inner or second, piece 32, is telescopically received in base piece 30 and configured for connection to oil filter 18. The configuration of first and second pieces 30 and 32, with second piece 32 being received in first piece 30 telescopically, allows an overall length of connector bolt 12 to be established by the relative location of second piece 32 within first piece 30. A securement configuration 34 is established between first piece 30 and second piece 32 to fix an adjusted position of second piece 32 within first piece 30. Accordingly, first piece 30 and second piece 32 can be used for a variety of different engine configurations requiring different overall lengths for connector bolt 12. Second piece 32 is inserted into first piece 30 and is held by suitable fixture devices or the like at the appropriate overall length for bolt 12, until securement configuration 34 is developed between first piece 30 and second piece 32 to fix the position of second piece 32 within first piece 30.

First piece 30 is a hollow body having a distal end 36 configured for attachment to engine block 14. In the exemplary embodiment shown, as best seen in FIG. 4, first piece 30 is internally threaded at distal end 36 with a female thread 38 for attachment to engine block 14. However, those skilled in the art should understand that distal end 36 can also be provided with external threads for threaded engagement in a female threaded orifice of engine block 14.

Second piece 32 is also a hollow tubular body of slightly less outer diameter than the internal diameter of first piece 30. Accordingly, second piece 32 is telescopically received in first piece 30. A second piece distal end 40 of second piece 32 is configured for attachment to oil filter 18. In the exemplary embodiment shown, second piece distal end 40 has an external thread 42 thereon for threaded engagement in a threaded orifice of oil filter 18. Those skilled in the art should readily understand that second piece distal end 40 also can be internally threaded for receiving a threaded male member of oil filter 18. Inwardly from thread 42, second piece 32 defines an outwardly extending flange 44 and a shoulder 46, which will be explained in greater detail herein after. In the assembled configuration, flange 44 and shoulder 46 are disposed outwardly of first piece 30 with an inner end 48 of second piece 32 disposed in first piece 30.

Securement configuration 34 of the embodiment illustrated most clearly in FIG. 4 includes first and second axially spaced annular inward deformations 50 and 52 of first piece 30. Deformations 50 and 52 are formed inwardly to engage against second piece 32. To further establish a fixed connection of second piece 32 within first piece 30, inner end 48 of second piece 32 is provided with a radially outwardly extending projection 54. Deformations 50 and 52 are formed against axially opposite ends of projection 54 such that projection 54 axially overlaps each of first deformation 50 and second deformation 52. Accordingly, with projection 54 sandwiched between deformations 50 and 52 second piece 32 cannot be moved axially relative to first piece 30 and the overall length of connector bolt 12 is fixed.

Figure 6:
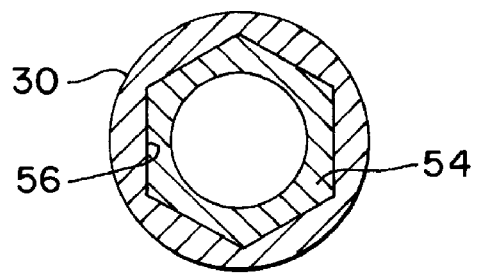
FIG. 6 is a cross-sectional view of the connector bolt shown in FIGS. 3 and 4, taken along line 6-6 of FIG. 3.

To prevent relative axial rotation between first and second pieces 30 and 32, projection 54 is provided in the nature of a multifaceted body, such as a hex head (see FIG. 6). Other shapes with more or fewer facets thereon can be used as well. The internal configuration of first piece 30 can have an axial length thereof with a corresponding shape 56 for engaging projection 54. Shape 56 can be formed in first piece 30 during initial formation of first piece 30, or the deformation of first piece 30 while creating deformations 50 and 52 can include deformation of at least a portion of first piece 30 between deformations 50 and 52 to engage projection 54. Various inter-related shapes can be sued for projection 54 and corresponding shape 56, to provide a mechanical interlock between first piece 30 and second piece 32 to physically resist relative axial rotation between first piece 30 and second piece 32. Generally, non-circular shapes are preferred.

In the exemplary embodiment, deformations 50 and 52 are continuous circumferential inward deformations. Also, projection 54 is a continuous circumferential extension or flange. It should be understood however that it may be acceptable in some uses of the present invention to provide deformation 50 and/or deformation 52 as a series of discontinuous inward deformations. So also, it may be adequate in some uses of the present invention that projection 54 be a series of discontinuous spaced projections. Multiple projections 54 of the same or different shapes also can be used with a correspondingly appropriate number of deformations 50, 52.

Flange 44 is provided to capture a feature within oil cooler 16, to draw cooler 16 against engine block 14 as distal end 36 is threaded onto stud 24. Flange 44 can be of sufficient width alone, or can be used with washers (not shown). The manner in which an oil cooler is capture and drawn against an engine block is known to those skilled in the art and will not be described in further detail herein.

Shoulder 46 has an outside diameter the same as the outside diameter of first piece 30, to accommodate set-up fixtures for aligning first part 30 with second part 32 during assembly. A distance between shoulder 46 and the end of first piece 30 can be used to establish an overall length of bolt 12.

A sealant 58 can be used between first piece 30 and second piece 32, to further establish a fluid sealed between first and second pieces 30 and 32. Sealant 56 can be an O-ring compressed between first and second pieces 30 and 32, a flexible seal material injected between first and second pieces 30 and 32, a welded bead between first and second pieces 30 and 32 or other similar barrier to the migration of fluid there past.

Figure 5:
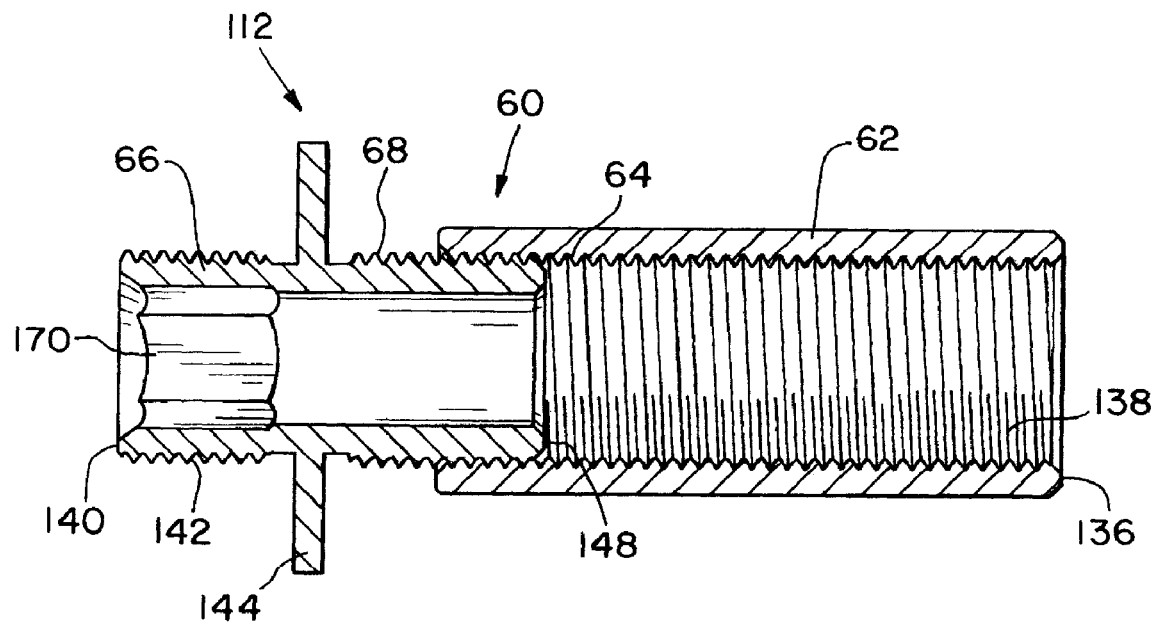
FIG. 5 is a cross-sectional view similar to that of FIG. 4, but illustrating a second embodiment of the present invention.

FIG. 5 illustrates an alternative securement configuration 60 for a bolt 112. A first piece 62 is provided with an internal thread 64 and a second piece 66 is provided with an external thread 68. Second piece 66 is threadedly engaged with first piece 62 and advanced therealong until the desired overall length is achieved, with an inner end 148 of second piece 66 disposed in first piece 62. Suitable thread locking substance can be used in threads 64 and 68. Further, mechanical deformation can be used to fix the threaded position of second piece 66 in first piece 62. Bolt 112 further includes a distal end 136 having a thread 138 and a distal end 140 having a thread 142 similar to the aforedescribed distal ends and threads 36, 38, 40 and 42, respectively. Flange 144 is provided similar to flange 44.

An internal hex drive configuration 70, 170 can be used for receiving a tool to rotate bolt 12, 112 while engaging thread 38, 138 with stud 24, and drawing cooler 16 snuggly against engine block 14. An external drive configuration (not shown) also can be used; however internal configuration 70, 170 reduces potential damage of thread 42, 142 from tools passed adjacent thereto to engage an external drive configuration inwardly of thread 42, 142.

Since the overall length of connector bolt 12, 112 is made up of individual pieces formed by first piece 30 or 62 and second piece 32 or 66, the smaller components forming connector bolt 12, 112 can be formed by inexpensive means such as cold forming or the like. Accordingly, the manufacture thereof is less expensive than if more expensive techniques, such as machining, are required. Material waste also is reduced in a cold forming process. Accordingly, connector bolts and can be provided in a cost efficient manner. Further, since the same pieces can be used to form connector bolts of different lengths, the connector bolt can be assembled and formed when needed and at the length required for the particular configuration being assembled at that time. Therefore, inventory requirements are reduced in that only two parts are required to form a large variety of connector bolts of different lengths.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A connector bolt of selectable variable length comprising:
   a first hollow piece having a distal end with a thread for threaded attachment to a first object;
   a second hollow piece being a single unitary hollow tubular body having a second hollow piece distal end at an opposite end of said first bolt from said first hollow piece distal end, said second piece distal end having a thread for threaded attachment to a second object;
   said tubular body having a projection radially extending outward from said tubular body at an inner end of said second hollow body
   said radially outward projection at said inner end of said second hollow piece received in said first hollow piece in a fluid tight engagement whereby fluid can flow through said first and second pieces;
   a securement configuration between first and second hollow pieces selectively capturing said radially outward projection at a selected variable position in said first hollow piece whereby an adjusted position of said second hollow piece in said first hollow piece is fixed for establishing a selected overall length of said connector bolt; and
   said securement configuration including said first hollow piece having at least one deformation compressed against said second hollow piece therein.

2. The connector bolt of claim 1, said securement configuration including said first hollow piece having first and second axially spaced deformations compressed against said second hollow piece therein.

3. The connector bolt of claim 2, said securement configuration including said radially outward projection axially overlapping said first and second deformations and positioned between said first and second deformations.

4. The connector bolt of claim 3, said radially outward projection having multiple outer facets.

5. The connector bolt of claim 3, said securement configuration including a non-circular portion of said second hollow piece with said first hollow piece, and an adjacent portion of said first hollow piece having a corresponding shape engaging said non-circular portion of said second hollow piece and resisting relative axial rotation between said first and second hollow pieces.

6. The connector bolt of claim 1, including a seal between said first and second hollow pieces.

7. The connector bolt of claim 1, said second hollow piece hollow having an external thread thereon for engaging the second object and said second hollow piece distal end having an internal configuration for receiving a tool to rotate said connector bolt relative to the first object.

8. A connector bolt of selectively variable length for connecting an oil filter and oil cooler to an automobile engine block, said connector bolt comprising:

a first hollow piece having a first hollow piece distal end with a thread for threaded engagement with an engine block;

a second hollow piece being a single unitary tubular body having a second hollow piece threaded end for threaded engagement with an oil filter, said tubular body having a projection radially extending outward from said tubular body at an inner end of said second hollow body, and a flange configured for capturing an oil cooler between said flange and the engine block;

said radially outward projection of said second hollow piece being telescopically received in said first hollow piece to establish a selectively variable overall length of said connector bolt, with said first hollow piece distal end and said second hollow piece distal end being at opposite ends of said connector bolt; and said first hollow piece having a deformation compressed against said second hollow piece therein.

9. The connector bolt of claim 8, said first hollow piece including first and second axially spaced deformations compressed against said second hollow piece therein.

10. The connector bolt of claim 9, said radially outward projection axially overlapping said first and second deformations and positioned between said first and second deformations.

11. The connector bolt of claim 10, said radially outward projection being a noncircular projection adjacent an end of said second hollow piece.

12. The connector bolt of claim 8, including a non-circular portion of said second hollow piece within said first hollow piece, and an adjacent portion of said first hollow piece having a corresponding shape engaging said non-circular portion of said second hollow piece and resisting relative axial rotation between said first and second hollow pieces.

* * * * *